(12) United States Patent
Li et al.

(10) Patent No.: US 8,606,743 B2
(45) Date of Patent: Dec. 10, 2013

(54) SYSTEM AND METHOD TO CALCULATE TIME WEIGHT IN RDF GRAPHS

(75) Inventors: Li Li, Bridgewater, NJ (US); Wu Chou, Basking Ridge, NJ (US); Feng Liu, Hillsborough, NJ (US)

(73) Assignee: Avaya Inc., Basking Ridge, NJ (US)

( * ) Notice: Subject to any disclaimer, the term of this patent is extended or adjusted under 35 U.S.C. 154(b) by 247 days.

(21) Appl. No.: 13/239,882

(22) Filed: Sep. 22, 2011

(65) Prior Publication Data

US 2012/0254102 A1     Oct. 4, 2012

Related U.S. Application Data

(60) Provisional application No. 61/471,442, filed on Apr. 4, 2011.

(51) Int. Cl.
G06F 17/00 (2006.01)
G06N 7/00 (2006.01)
G06N 7/08 (2006.01)

(52) U.S. Cl.
USPC .......................................................... 706/58

(58) Field of Classification Search
USPC .......................................................... 706/58
See application file for complete search history.

(56) References Cited

U.S. PATENT DOCUMENTS

| | | | |
|---|---|---|---|
| 7,899,861 B2 * | 3/2011 | Feblowitz et al. | 709/201 |
| 8,112,416 B2 * | 2/2012 | Liu et al. | 707/720 |
| 8,150,835 B2 * | 4/2012 | Boldyrev et al. | 707/713 |
| 8,161,452 B2 * | 4/2012 | Creighton et al. | 717/100 |
| 8,332,434 B2 * | 12/2012 | Salkeld et al. | 707/794 |
| 8,332,624 B2 * | 12/2012 | Sovio et al. | 713/150 |
| 8,335,754 B2 * | 12/2012 | Dawson et al. | 706/45 |
| 8,429,108 B2 * | 4/2013 | Eusterbrock | 706/45 |
| 8,488,783 B2 * | 7/2013 | Sovio et al. | 380/44 |

OTHER PUBLICATIONS

Andrea Pugliese et al., "Scaling RDF with Time," Apr. 21-25, 2008, Beijing, China, 10 pages.
Jun Zhao et al., "Provenance Requirements for the Next Version of RDF," 2010, 5 pages.
Olaf Hartig, "Querying Trust in RDF Data with tSPARQL," 2009, 15 pages.
Richard Cyganiak et al. "N-Quads: Extending N-Triples with Context," Retrieved Sep. 23, 2011 from http://sw.deri.org/2008/07/n-quads/, 3 pages.
Patrick Hayes, "RDF Semantics," Feb. 10, 2004, 55 pages.

(Continued)

*Primary Examiner* — Michael B Holmes
(74) *Attorney, Agent, or Firm* — Kacvinsky Daisak PLLC; John Maldjian, Esq.; ALexander D. Walter, Esq.

(57) ABSTRACT

Method to calculate time weight in an RDF graph, including: providing one or more triples of the RDF graph to an inference engine module, the one or more triples comprising a time information; providing a reference time to the inference engine; calculating an elapsed time from the reference time to the time value; and inversely weighting the time information by the elapsed time to provide a calculated time weight. Another embodiment may provide a method to update a time weight of a relation when an RDF graph has been added to or deleted from the relation. Another embodiment may provide a method to update a time weight of a relation represented by an RDF graph, when a new reference timestamp is provided. Another embodiment may provide a system to calculate time weight in an RDF graph.

20 Claims, 8 Drawing Sheets

(56) References Cited

OTHER PUBLICATIONS

Cai et al., "RDFPeers: A Scalable Distributed RDF Repository based on A Structured Peer-to-Peer Network," WWW 2004 Proceedings of the 13th International Conference on WWW, 8 pages.
Schönhofen, P., "Annotating documents by Wikipedia concepts," 2008 IEEE/WIC/ACM International Conference on Web Intelligence and Intelligent Agent Technology, 7 pages.
Dublin Core, Dublin Core Metadata Initiative, http://dublincore.org/, last accessed Nov. 11, 2011, 2 pages.
Ianni, G. et al, "Dynamic Querying of Mass-Storage RDF Data with Rule-Based Entailment Regimes," ISWC 2009, 16 pages.
Google Wave, http://wave.google.com/about.html, last accessed Nov. 11, 2011, 3 pages.
Large Triple Stores: http://www.w3.org/wiki/LargeTripleStores, last accessed Nov. 11, 2011, 5 pages.
Linked Data—Connect Distributed Data across the Web, http://linkeddata.org/, last accessed Nov. 11, 2011, 1 page.
Guo, J., "Longest Tokenization, Computational Linguistics and Chinese Language Processing," vol. 2, No. 2, Aug. 1997, 22 pages.
Urbani, J. et al, "Scalable Distributed Reasoning using MapReduce," ISWC 2009, Vo. 5823, 16 pages.
OWL 2004. OWL Web Ontology Language Overview, W3C Recommendation, Feb. 10, 2004, http://www.w3.org/TR/owl-features/, last accessed Nov. 11, 2011, 14 pages.
Husain, M. F. et al, "Storage and Retrieval of Large RDF Graph Using Hadoop and MapReduce," Lecture Notes in Computer Science, 2009, vol. 5931, 7 pages.
SWI-Prolog, http://www.swi-prolog.org/, last accessed Nov. 11, 2011, 2 pages.
Ferragina, P.; Scaiella, U., "TAGME: On-the-fly Annotation of Short Text Fragments (by Wikipedia Entitities)," CIKM' 10 Proceedings of the 19th ACM international conference on Information and knowledge management, 4 pages.
RDF. Resource Description Framework (RDF), http://www.w3.org/RDF/, last accessed Jan. 11, 2012, 3 pages.
Fielding, Roy T., "Architectural Styles and the Design of Network-Based Software Architectures," Ph.D. Dissertation, 2000, http://www.ics.uci.edu/~fielding/pubs/dissertation/top.htm, last accessed Jan. 11, 2012, 180 pages.
RDB2RDF, "Use Cases and Requirements for Mapping Relational Databases to RDF," W3C Working Draft, Jun. 8, 2010, http://www.w3.org/TR/rdb2rdf-ucr/, last accessed Jan. 10, 2012, 28 pages.

\* cited by examiner

SYSTEM AND METHOD TO CALCULATE TIME WEIGHT IN RDF GRAPHS

CROSS-REFERENCE TO RELATED APPLICATIONS

This application claims the benefit of U.S. Provisional Patent Application Ser. No. 61/471,442, filed on Apr. 4, 2011, the content of which is hereby incorporated by reference in its entirety.

BACKGROUND

1. Field of the Invention

Embodiments of the present invention generally relate to fast methods of updating time weights in a social relation representable by an RDF graph. Additional embodiments relate to updating the saved weight of a relation, and updating a saved time weight of a relation whenever a new reference timestamp is provided.

2. Description of the Related Art

Enterprise communication and collaboration typically involves email, meeting schedule, voice, video, chat, wild, blogs, and various forms of documents, such as design documents and bug reports related to products and service offerings. As different organizations adopt technologies at different paces, these rich sets of digital content often exist in different formats managed by different systems that are often not connected to each other. For example, emails between group members may be stored in special format at local disks or email servers. The product design documents are managed by some special proprietary relational database, whereas the project progress is tracked on a separate group wild site. As a consequence, a lot of valuable information is buried in disparate computers that are not readily accessible.

As the number of media types and the amount of digital contents increase, it can cost significant overhead and a reduction in productivity, as users may have to spend extra effort searching for the relevant information. For instance, when scheduling a project planning meeting between several groups, people typically receive invitations in email that have a subject, time and location, a short description, and some attachments and links. If people need to find out more background information about the participants, the previous history of contacts on this subject, or new products related to this project, people have to do searches using several special applications. As every participant repeats almost identical searches to become informed, the productivity of the enterprise is reduced as the number of participants increases.

There has been active research in how to process large scale Resource Description Framework ("RDF") databases. The focus of these efforts has been limited to efficient storage and retrieval of large datasets whereas embodiments in accordance with the present invention support general computing and inference over the datasets. Furthermore, the approaches have been based on a homogeneous architecture where a set of computers either use a single protocol or form a fixed topology.

REST composition service based approach does not assume any single protocol or topology.

There has been some work on using RDF database to annotate text. But these systems are special cases of proactive search that we propose. In addition, they do not propose a general architecture to support distributed functions.

REST service architecture in accordance with embodiments of the present invention are also different from the conventional 3-tier web architecture consisting of data, business logic and presentation. In the present architecture, the presentation is not consumed by end users but by agents. Unlike business logic that accesses local data, our logic can access distributed functions through service composition.

In an enterprise, people communicate and collaborate on daily basis. These activities form a social network that is dynamic and implicit with rich relations associated with social contents, e.g. email, IM, co-authorship, etc. This implicit social network can be discovered by inspecting the artifacts of these activities, such as email exchanges and authorships of project documents, and so forth. When calculating these relations, a relation with more recent and frequent activities are valued more than one with infrequent activities in the past, as people in the organizations can take different roles over time.

Thus, there is a need for a knowledge agent based approach for enterprise, derived from search technologies. In particular, there is a need for the knowledge agent to efficiently evaluate a temporal aspect of relations in the social network.

SUMMARY

Embodiments in accordance with the present invention provide a method, a system, and a software architecture based on agent and web service technologies to support proactive search to enrich enterprise communication and collaboration. In particular, software agents and REST web services may be combined to deliver relevant information found from RDF databases to the users without interrupting their workflows. The relevant information includes text annotations, implicit social networks, and recommended experts. Service composition may be used to efficiently combine results from distributed functions to support independent and scalable semantic web development. Experimental results indicate the proposed approach is feasible and efficient.

Embodiments in accordance with the present invention may provide a method to calculate time weight in an RDF graph, comprising: providing one or more triples of the RDF graph to an inference engine module, the one or more triples comprising a time information; providing an epoch time to the inference engine; calculating an elapsed time from the epoch time to the time value; and inversely weighting the time information by the elapsed time to provide a calculated time weight.

Embodiments in accordance with the present invention provide a method to update a time weight of a relation when an RDF graph has been added to or deleted from the relation, comprising: providing to an inference engine module the time weight of the relation; providing identification to an inference engine module of the RDF graph comprising timestamp $T_{n+1}$; providing an epoch time value to the inference engine; calculating an elapsed time from the epoch time to timestamp $T_{n+1}$; and updating the saved time weight by an inversely weighted function of the elapsed time.

Embodiments in accordance with the present invention provide a method to update a time weight of a relation represented by an RDF graph, when a new reference timestamp is provided, comprising: providing to an inference engine module the time weight of the relation at a first reference timestamp; providing a second reference timestamp to the inference engine; calculating an elapsed time from the first reference timestamp to the second reference timestamp; and updating the time weight of the relation by an inversely weighted function of the elapsed time.

Embodiments in accordance with the present invention provide a system to calculate time weight in an RDF graph, comprising: an inference engine module; a first communication interface to the inference engine module, the first communication interface configured to provide one or more triples of the RDF graph to the inference engine module, the one or more triples comprising a time information; a first communication interface to the inference engine module, the first communication interface configured to provide an epoch time to the inference engine, wherein the inference engine module is configured: to calculate an elapsed time from the epoch time to the time value; and to inversely weight the time information by the elapsed time, to provide a calculated time weight.

BRIEF DESCRIPTION OF THE DRAWINGS

So the manner in which the above recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments encompassed within the scope of the present invention, and, therefore, are not to be considered limiting, for the present invention may admit to other equally effective embodiments, wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines.

DETAILED DESCRIPTION

Embodiments of the present invention generally relate to fast methods of updating time weights in a social relation representable by an RDF graph. Additional embodiments relate to updating the saved weight of a relation, and updating a saved time weight of a relation whenever a new reference timestamp is provided.

As used herein in connection with embodiments of the present invention, the term "REST" refers to REpresentational State Transfer web services, as described below in further detail.

As used herein in connection with embodiments of the present invention, the term "RESTful" refers to a web service that is compatible with REST.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

An architectural style that underlies the Web is REpresentational State Transfer ("REST"). A web service that is compatible with REST is said to be "RESTful." REST provides resource management and promotes architectural choices that include: 1) Addressability—each resource can be addressed by Uniform Resource Identifier ("URI"); 2) Connectedness—resources are linked to provide navigations; 3) Uniform Interface—all resources support a subset of a uniform interface between components, namely GET, PUT, DELETE and POST; 4) Statelessness—all requests to a resource contain all of information necessary to process the requests, and the servers do not need to keep any context about the requests; and 5) Layering: intermediate proxies between clients and servers can be used to cache data for efficiency. Because of its relative simplicity, compared to SOAP-based web services, REST web service paradigm is gaining popularity for use in implementing mobile device applications. Researchers have also compared the performance of the same SOAP and REST services implemented on mobile devices. REST was found to be more suitable to mobile devices since REST required less processing time and memory.

As used herein in connection with embodiments of the present invention, the term "resource" refers to a special component that is addressable by URI and supports a uniform interface as defined by REST. Any information that can be named can be a resource: a document or image, a temporal service (e.g. "today's weather in Los Angeles"), a collection of other resources, a non-virtual object (e.g. a person), and so on. In other words, any concept that might be the target of an author's hypertext reference fits within the definition of a resource. A resource is a conceptual mapping to a set of entities, not the entity that corresponds to the mapping at any particular point in time.

The semantic web in our approach refers to a set of technologies based on the web architecture and knowledge representation languages including OWL Web Ontology Language and Resource Description Framework ("RDF"). RDF is a graph-structured data model which uses URIs to name nodes and arc types, arriving at subject-predicate-object triples.

N-Triples is a line-based, plain text format for encoding an RDF graph. N-Triples is a simple line-delimited syntax. N-Triples may be used as an RDF syntax for expressing RDF test cases and defining the correspondence between RDF/XML and the RDF abstract syntax. N-Triples can be extended to have context by use of a syntax called N-Quads. Each triple in an N-Quads document can have an optional context value:
<subject> <predicate> <object> <context>.

As opposed to N-Triples, where each triple has the form:
<subject> <predicate> <object>.

The semantic web technologies offer a set of solutions to address the heterogeneous data problem in enterprises, whereas URI provides a uniform identification mechanism for data in enterprises, and RDF provides a uniform representation language about the relations between those identified data. In addition, HTTP provides a uniform protocol to access the distributed data, and SPARQL provides a declarative way to query those data. Moreover, ontologies offer a way to integrate RDF graphs from different sources. Because semantic web technologies are based on Description Logic (RDF 2004), they also offer a framework to reason and inference about the data.

Despite these advantages, a challenge to adopt semantic web for enterprise is how to transform the raw enterprise data into RDF. It is ideal but unrealistic to force all enterprise systems and applications to expose their data according to a predefined ontology. Instead, organizations should be allowed to evolve their semantic web incrementally and independently. To support this evolutionary path, we adopt the REST web service paradigm as our semantic web infrastructure, because REST is suited for such distributed hypertext systems. Unlike conventional approaches to semantic web that aim to support linking and querying of raw RDF triples (Linked Data), we focus on developing knowledge based web services that can enhance enterprise communications. In particular, we investigate how to develop a scalable and robust REST architecture that can share and compose distributed knowledge web services across organizations.

Proactive search pushes relevant information to users without a user specifically asking for the relevant information. Proactive search is a departure from current interactive search paradigm in several aspects. In interactive searches, a user composes a specific query, enter it into a search box, select results and integrate them into his application manually. Albeit being quite flexible, interactive search has some disadvantages and limitations. Firstly, the interactive search mode usually forces a user to leave his current activity and work on a separate search activity. Secondly, the query does not carry the context from which the search is launched. Thirdly, the results of interactive search depend on the quality and accuracy of user's query. Fourthly, to integrate the search result back into the user's workflow and context, it typically requires user's manual operation.

In proactive search, a user's communication activity is treated as the query to the search engine, thereby providing the necessary context for more accurate results. Instead of asking a user to select the results, proactive search integrates relevant information directly into the communication activity in a nonintrusive way. As a result, the user can focus on his business activities without taking detours to seek for relevant information. For example, an incoming email or an outgoing email can be treated as query to the proactive search engine. The relevant information found about the topic, people or products mentioned in the emails is integrated into the emails as hyperlinks. The disadvantage of proactive search is that the input is limited to current user's activity and context. The second challenge in adopting semantic web technologies is how to determine what is relevant given a context as this is significantly more complex than most queries. In open domain search, these may be very difficult problems. However, as enterprises have more organized and predictable activities and workflows than individual users, we can use those patterns in enterprise data to help tackle these tough problems.

Proactive search can be supported by client-server architecture as interactive search. However, the clients in proactive search assume more responsibility than in interactive search. In proactive search, the clients may be software agents that monitor user's activities and invoke the corresponding knowledge base web services to obtain the right information at the right time.

Overall Architecture

This section presents the overall architecture of a semantic web based system. To support semantic web based proactive search, we provide customized semantic web based functions that may be targeted to different business environments. For example, in a call center, we need functions that classify emails, annotate important concepts in emails, and suggest relevant responses. In a group collaboration application, we need functions that bring up contact history on a subject and show common interest between participants. However, due to the limitation of SPARQL, many of these functions cannot be implemented as SPARQL queries to RDF databases. For this reason, we decide to expose these functions as REST services that may be sharable and reusable across organizations. REST services encourage distributed and independent development of services, which is one of our design goals. Besides connecting different applications, our REST composition approach allows us to distribute a semantic function that is too large for one machine to multiple machines in parallel, and use service composition to aggregate the distributed logic.

On the client side, our software agents may be embedded in user's communication and collaboration applications. These agents monitor user's activities, retrieve relevant information from the REST services, and inject the relevant information into the collaboration environment.

Figure 1:
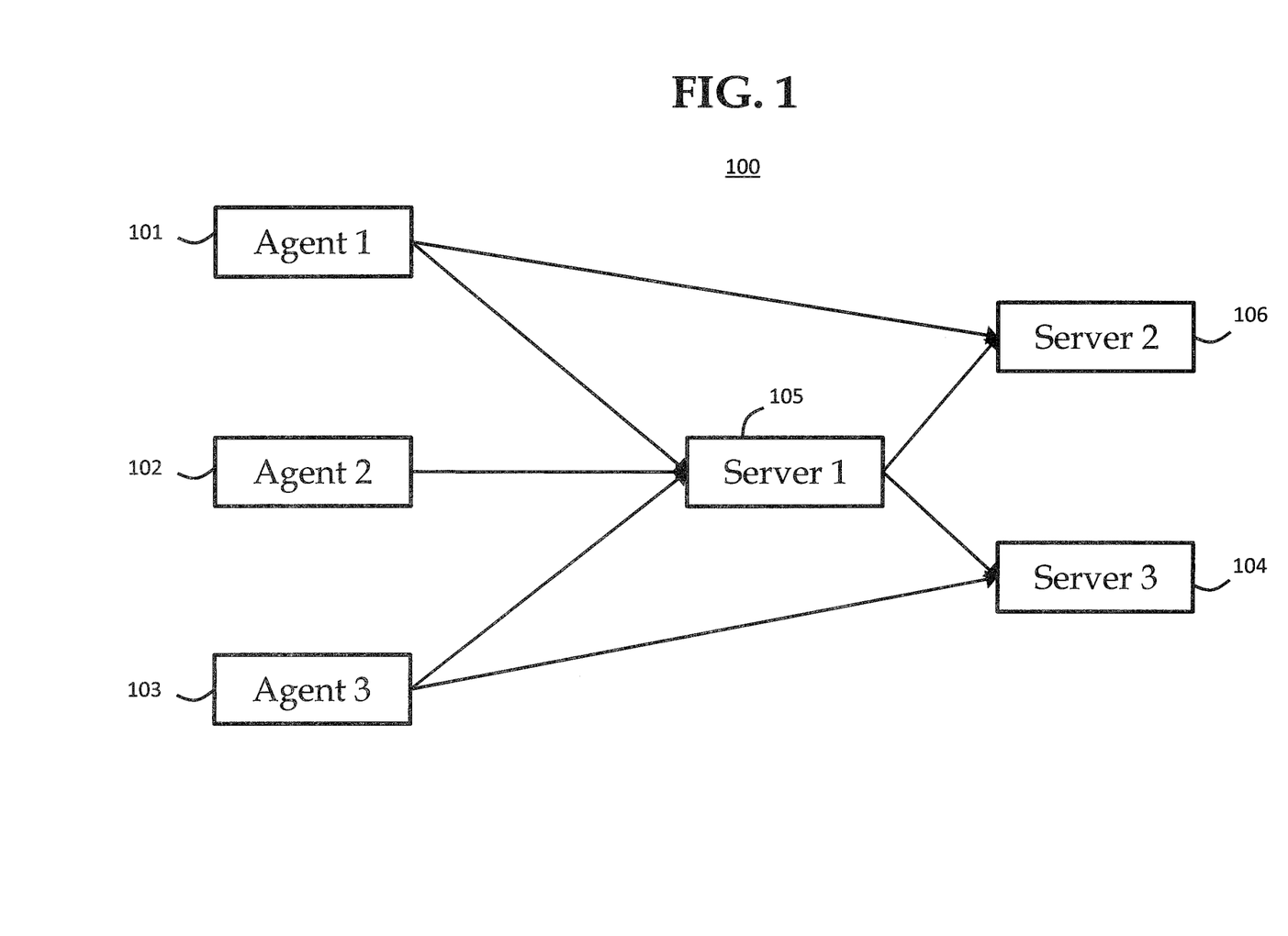
FIG. 1 illustrates high-level components of REST architecture in accordance with an embodiment of the present invention.

FIG. 1 illustrates the high level components in a REST composition architecture 100 in accordance with embodiments of the present invention. Architecture 100 comprises one or more agents 101-103 in communication with one or more servers 104-106. Some servers, e.g., server 105, may in turn be in communication with other servers, e.g., servers 104, 106. The number of agents and/or servers may depart from the quantity depicted in architecture 100.

By driving the states of agents 101-103 with hypertext from the REST services, REST architecture 100 offers the following degrees of freedom for adopting independent changes. At the server 104-106 side, a new service can be deployed without having to reconfigure all the agents 101-103. An existing service can be upgraded without breaking those agents that use the service. On the client side, agents 101-103 can acquire different "skills" required for different environments by following the hyperlinks to different REST services. Although in this architecture the agents 101-103 do not need to directly communicate with each other, they can still collaborate indirectly by sharing their states through the servers 104-106. Agents 101-103 and servers 104-106 can also use content negotiation to find the best representation for a given situation.

Figure 2:
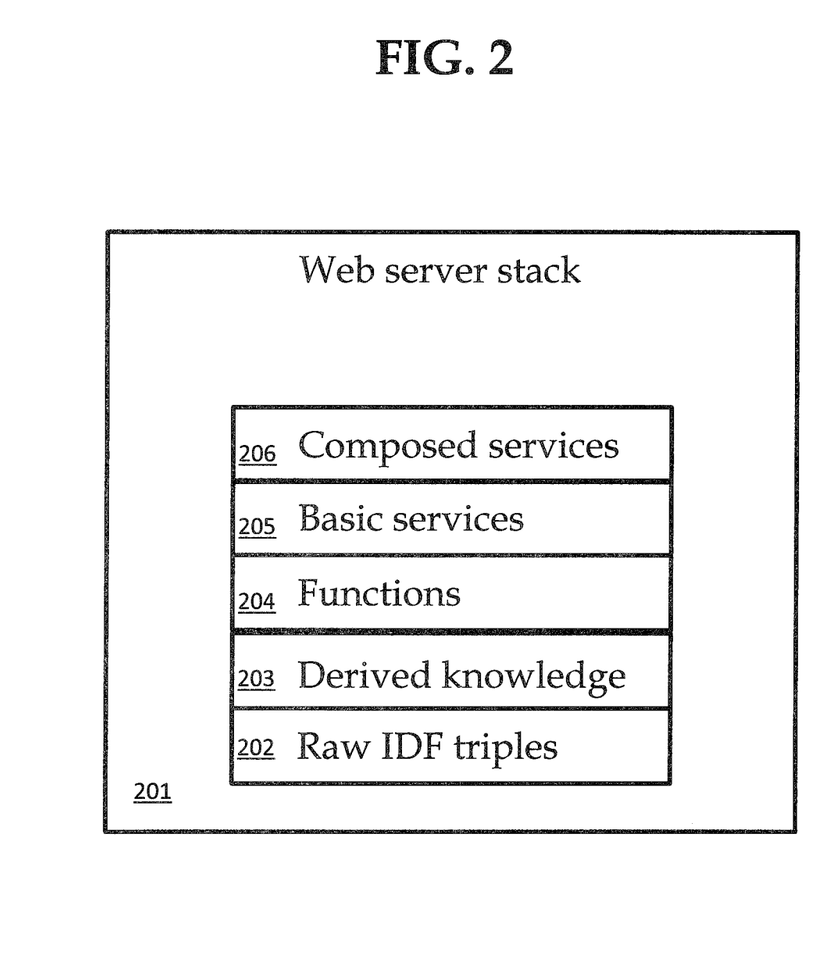
FIG. 2 illustrates a web server stack in accordance with an embodiment of the present invention.

FIG. 2 conceptually illustrates modules within at least one of servers 104-106 in accordance with embodiments of the present invention, and in particular FIG. 2 illustrates how each such server comprises a web server stack 201 that builds the REST services from the knowledge base in layers. For example, web server 201 may include a lowest layer a Raw IDF Triples module 202. The Raw IDF Triples module 202 interfaces at a higher level with a Derived Knowledge module 203. The Derived Knowledge module 203 interfaces at a higher level with a Functions module 204. The Functions module 204 interfaces at a higher level with a Basic Services module 205. The Basic Services module 205 interfaces at a higher level with a Composer Services module 206.

The bottom layer 202 is the raw RDF triples collected from various sources of enterprise data, including relational databases and web pages. On top of this, it is a layer of the knowledge 203 derived from the RDF triples—some of those triples may be collected off-line, and some of them may be derived dynamically based on queries. A function layer 204 takes an input query and produces some outputs based on the derived knowledge layer 203. The basic REST services layer 205 exposes these functions as resources, and the composed REST services layer 206 invokes the basic services 205 or composed services 206 at local and remote servers to carry out a task.

Service composition is a process that implements a service by combining outputs from other services. This process can be used to break a large semantic database into small ones and distribute a related function into a set of servers that form a tree structure. The servers in the leaf nodes offer the basic services, while the servers in the interior nodes offer partially composed services. As the result, the server at the root node offers the completely composed services. Because the services may be stateless, a composed service invokes its children services in parallel and merges the results for its parent.

Figure 3:
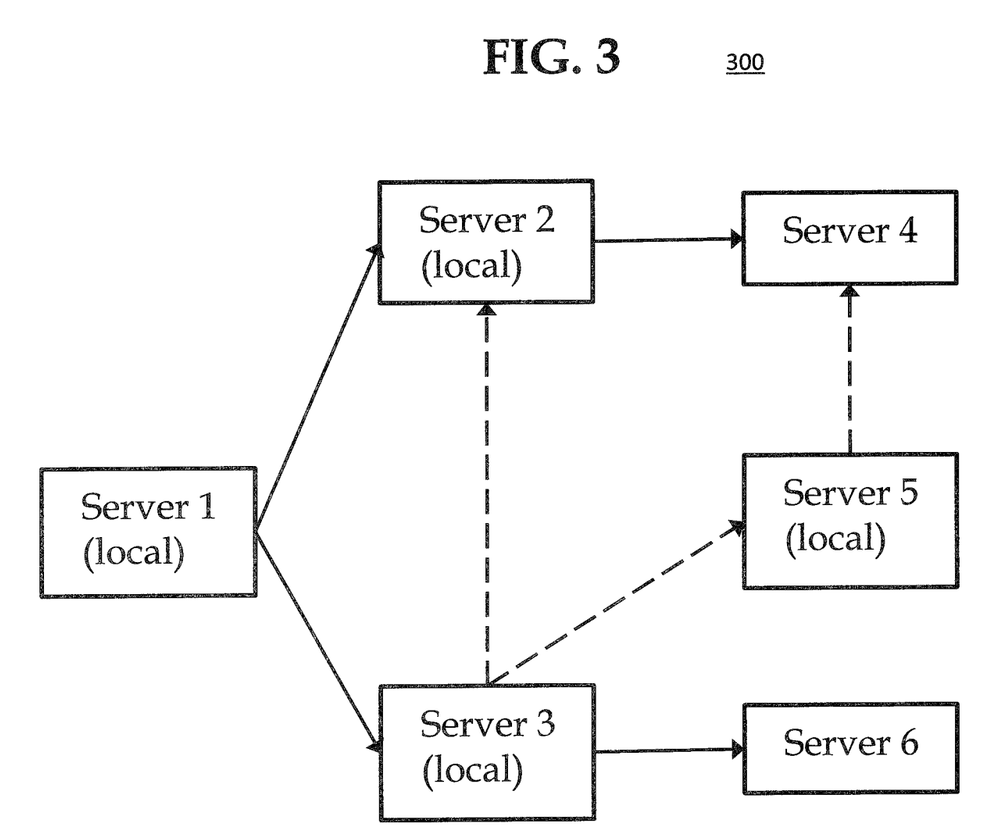
FIG. 3 illustrates service compositions of two distributed functions in accordance with an embodiment of the present invention.

FIG. 3 illustrates a system 300 in which a plurality of servers have been split into two sets of servers that form separate tree structures, in accordance with an embodiment of the invention. A first tree structure is indicated by solid connecting lines, and a second tree structure is indicated by dashed connecting lines. Server 1, server 2, server 3 and server 5 are identified as "local" servers, meaning that some local services are involved in the compositions at those servers. Server 4 and server 6 are not identified a local servers, meaning that the compositions at those servers are made entirely without any local services.

Notice that this composition architecture is different from the conventional computer cluster architecture which has a fixed entry point and a specified topology. Instead, in our case, each distributed function may have a different entry point and topology of its own. For example, FIG. 3 illustrates two distributed functions with entry points Server 1 and Server 3 respectively. Server 1 is the entry point to the server tree consisting of Servers 1, 2, 3, 4, 6 and Server 3 is the entry point to the server tree consisting of Servers 2, 3, 4, 5.

RDF Transformation

This section discusses the knowledge transformation process. As enterprise data often exist in different forms and formats, they have to be transformed into semantic web first. This transformation contains two steps. First the data may be transformed into web resources that have unique URI. Second the metadata may be extracted and transformed into RDF triples, often with the help of public and private ontologies. For structured data, such as relational databases, this transformation is straightforward. In our study, we have transformed a relational database about documents with 160,699 records into 3,182,721 triples following the Dublin Core ontology. The subject is the document URI in all triples. The following are some sample triples with sensitive information replaced by generic strings:

<uri_1>
<http://purl.org/dc/elements/1.1/title> "Title 1" .

<uri_1>
<http://purl.org/dc/elements/1.1/creator> "Author 1" .

Our experience shows some problems for well-defined data. First, many important relations (i.e., predicates) are not in Dublin Core or other known ontologies. We created and added private ontologies to cover them, but they cannot interoperate easily outside this domain. Second, many data fields, such as author names, may not be properly entered in the database. Many names have variations that make matching and cross-reference from other RDF databases difficult.

Functions and Services

This and the following sections present some functions and services built into an approach and architecture in accordance with embodiments of the present invention. Within our proposed REST architecture, we develop several exemplary functions and services for semantic web based proactive searches, including Entity Annotation, Implicit Social Network, and Exert Finder.

Entity Annotation

Entity annotation function takes an incoming text and produces a set of annotations for the entities in the text based on current knowledge. An annotation is a 4-tuple (phrase, start, length, link) that identifies the phrase being annotated, the starting position and the length (both in characters), and the concept related to the phrase. When clicked, the link will open a web page showing the detail information.

To support this function, we first index the RDF triples on selected predicates. This dramatically reduces the indexing and search space from entire literals to the selected literals. Another technique to save memory and improve efficiency is to avoid creating separate index. Instead, we pre-process RDF triples by tokenizing the literals into phrases so that they would match the tokenized input. The outcome of this process is a many-to-many mapping from indexed phrases to concepts.

Figure 4:
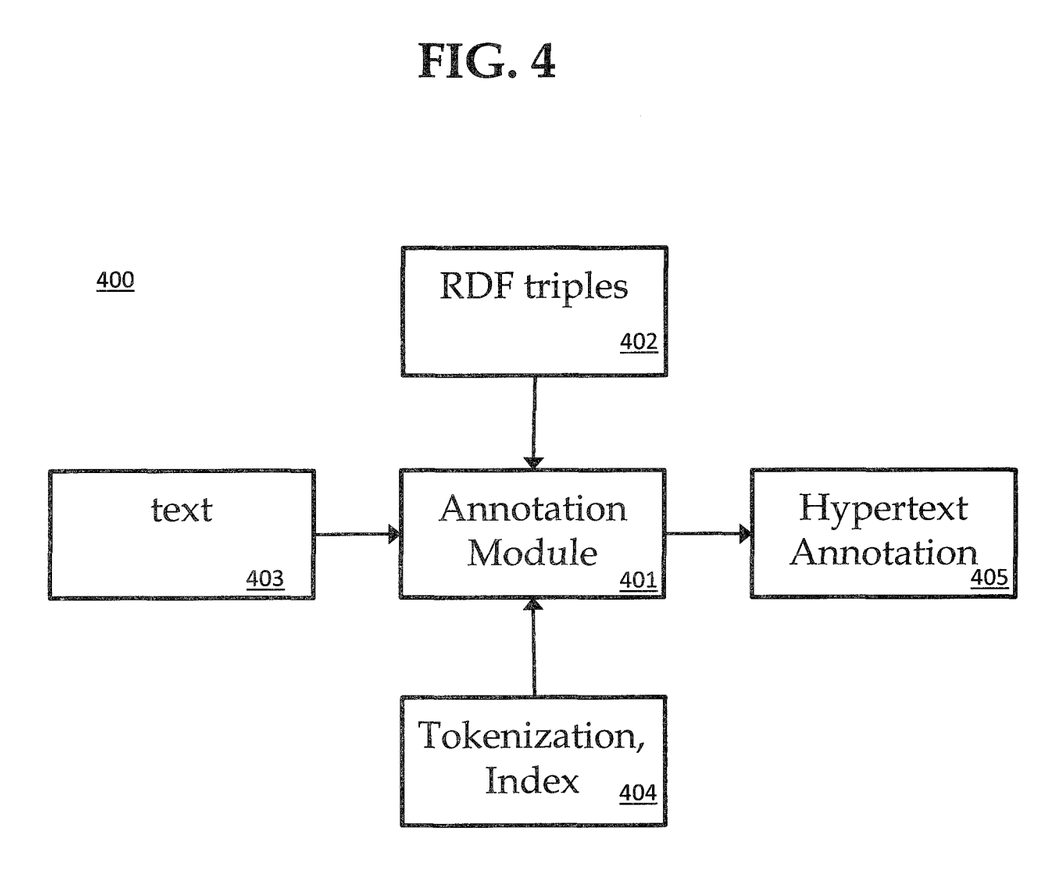
FIG. 4 illustrates components of the annotation function in accordance with an embodiment of the present invention.

FIG. 4 illustrates high-level components of a left-to-right maximum tokenization process 400. Process 400 comprises an annotation module 401, which receives inputs from an RDF triples module 402 that stores the IDF triples, a text module 403 that stores the raw natural language (i.e., English text), and a tokenization and indexing module 404 that tokenizes the text and provides an index into triples provided by module 402. The annotation module 401 provides its output to a hypertext annotation module 405. Module 401 uses the information in modules 402 and 404 to associate relevant URIs with the tokens.

Process 400 may be a modification of a left-to-right maximum tokenization process developed for Chinese language processing. The process aims to find the longest token sequence from left to right that matches an indexed phrase in the RDF triples and record the corresponding concept. If more than one concept is found, the server creates a link representing a list of matches. Unlike the traditional tokenization process that covers the entire text, a process in accordance with the present invention skips unmatched tokens.

Process 400 is exposed as a REST service on a designated resource. There are two ways to invoke the service: HTTP GET and HTTP POST. GET is used for short text, and POST is used for long text. The REST service returns related annotations in the following formats: 1) Java Script Object Notation ("JSON") for agents in web browsers; 2) HTML for direct rendering in web browsers; 3) HTML tables for embedding and debugging in web browsers; and 4) Prolog terms for efficient service composition.

In a tree of servers, some servers may be configured as parents, some as children, and some servers as both parents and children. For instance, referring to the tree structure of FIG. 3 denoted by solid lines, Server 1 is a parent, Servers 2 and 3 are both parents and children, and Servers 4 and 6 are only children. When this function is distributed on a tree of servers like that of FIG. 3, the parent server sends a copy of the text to all its children in parallel, which will return the annotation results or faults. Once the parent server receives all the results within a timeout interval, it merges what it received so far into a coherent annotation and sends it back to its parent or the client if it is the root server. To maintain the longest phrase condition, the merge process removes all covered phrases. In other words, if a server returns an annotation for phrase x and another server returns a phrase that contains x as a substring, then the first annotation is removed from the merged annotation. The merged annotation therefore will contain only longest phrases.

Implicit Social Network

In a business or social enterprise, people communicate and collaborate on a daily basis. These activities form a social network that is dynamic and implicit with rich relations associated with social contents, e.g. email, instant messaging, co-authorship, etc. This implicit social network can be discovered by inspecting the artifacts of these activities, such as email exchanges and authorships of project documents, etc. Because there may be very rich relations between people in an organization, our semantic web approach is well suited for representing and discovering such implicit social networks. Table 1 below sets forth relationships that may be useful to a person in implicit social networks.

TABLE 1

Relations in implicit social network:

| Relation | Comment |
|---|---|
| Collaborators | Collaborators of this person |
| Followers | People interested in this person |
| Citations | Artifacts that cite this person |
| Products | Artifacts made by this person |
| Expertise | Expertise of this person |

To cope with the dynamic nature of the implicit social network and to save memory, these relations may be derived by rules in response to incoming queries. The input of this function is a URI identifying a person, and the output is the relations about the persons found in the knowledge base. Because this information is to be consumed by human users in our system, the current output supports only HTML in which relations may be represented as hypertext.

Figure 5:
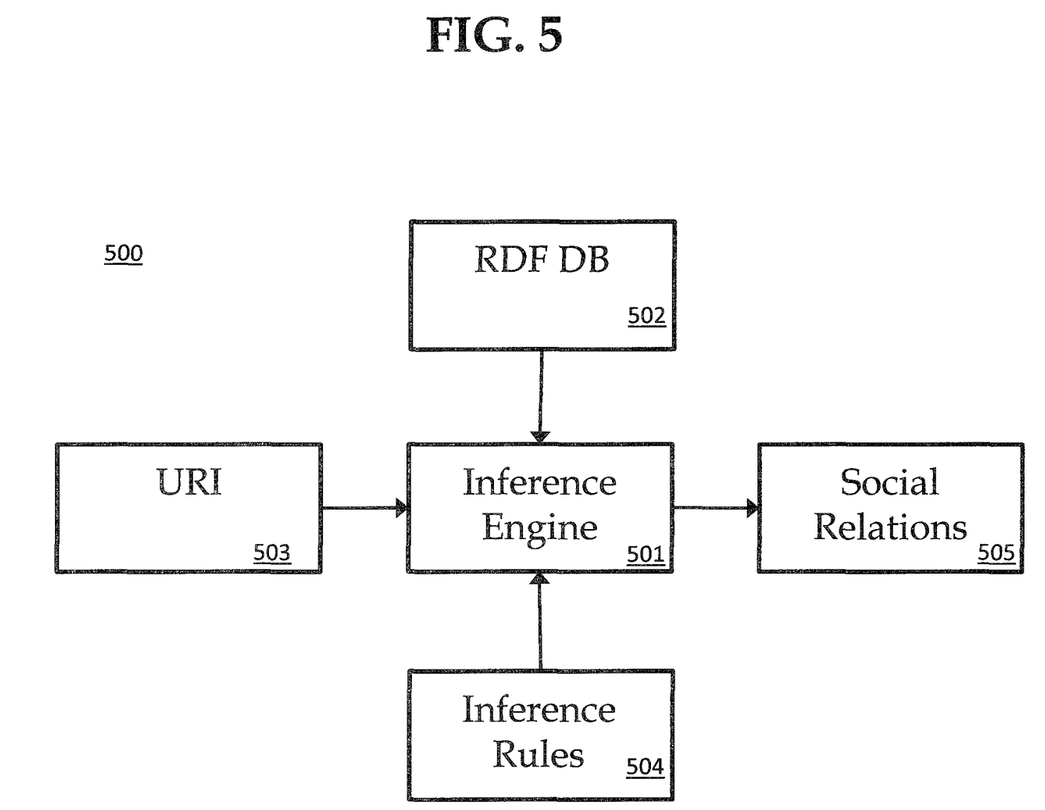
FIG. 5 illustrates an Implicit Social Network function, in accordance with an embodiment of the present invention.

FIG. 5 illustrates the high-level components of a system 500 to dynamically calculate the nature of the implicit social network. System 500 comprises an inference engine module 501 which receives inputs from an RDF database ("DB") module 502, a URI module 503 identifying a person, and inference rules module 504. Inference engine 501 creates inferences, which are then sent to a social relations module 505.

When calculating these relations, a relation having more recent and frequent activities may be valued more than a relation having less recent and less frequent activities in the past, because people in the organizations can take different roles over time. The activities in a relation therefore may be weighted by an exponential decay function to reflect this time-based relevance value. Assume that a relation R is derived from a set of n activities each with timestamp $T_i$, then the time value of this relation, with respect to the current timestamp T, is calculated as listed in equation (1), where C is a normalizing factor and $\lambda$ is a scaling factor:

$$tv(T, \lambda, C, R) = C \sum_{i=1}^{n} e^{-\lambda(T-T_i)}, R = \{T_i \mid 1 \le i \le n\} \quad (1)$$

Similar to the annotation module 401, when this function is distributed, the parent server sends a copy of the URI to its children servers in parallel, which return the relations (or faults). The parent server then merges the results using set unions.

Expert Finder

In many enterprise systems, there is a need to find experts with certain skills, so that a problem can be directed to the most qualified persons. In an organizational environment, since we value team work and influence as much as individual skills, a need exists for an Expert Finder process to find experts who not only have required expertise, but also have high reputation and authority.

The expertise of a person can be evaluated based on the products he produces or contributes. For example, if a person designed several web servers, it is reasonable to assume he is an expert in that area. In embodiments in accordance with the present invention, the expertise of a person is represented as a vector where each dimension corresponds to a skill and the value indicates the strength of the skill. To speed up the matching process, a training process is used to compute and save the expertise vectors for each person in the knowledge base. For a person p with an expertise vector e, the relevance of p with respect to a given problem description vector x can be calculated as listed in Equation (2) using the vector space based semantic model as the angle between x and e.

$$\text{relevance}(p) = \cos(x, e) \quad (2)$$

The reputation of a person can be evaluated based on how other people evaluate his work. This is calculated as listed in Equation (3) with bounded recursion and loop detection based on the implicit social network as follows, where rating (p) reflects the total evaluation a person has received.

$$\text{reputation}(p) = \text{rating}(p) + \text{Sum of reputation(followers}(p)) \quad (3)$$

The authority of a person captures how much power a person has in an organization. It can also be calculated as listed in Equation (4) with bounded recursion and loop detection based on implicit social network as follows, where level (p) corresponds to the power level a person has in an organizational hierarchy.

$$\text{authority}(p) = \text{level}(p) + \text{Sum of authority(collaborators}(p)) \quad (4)$$

The input to the expert finder function is a text describing a problem, and the output is a ranked list of experts. The input text is first converted to a vector to search for persons whose expertise is above a threshold. The candidates in the list then may be re-ranked by averaging the normalized relevance, reputation and authority scores.

Figure 6:
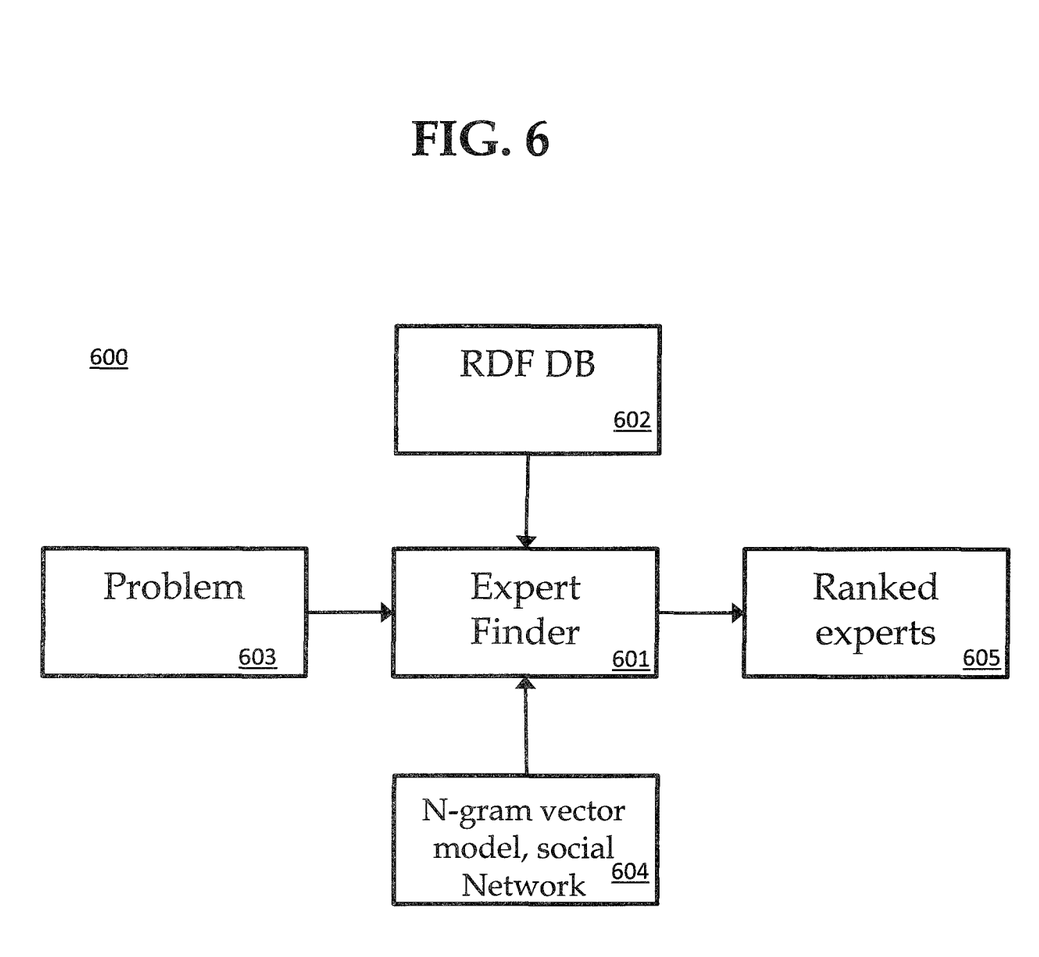
FIG. 6 illustrates an Expert finder function in accordance with an embodiment of the present invention.

FIG. 6 illustrates the high-level components of a system 600 to dynamically find an expert. System 600 comprises an expert finder module 601 which receives inputs from an RDF database ("DB") module 602, a Problem module 603 identifying a problem (e.g., a textual description of a problem to solve), and an N-gram vector model of a social network module 604. Expert finder module 601 identifies experts. A list of identified experts is then sent to an Expert Ranking module 605.

When the Expert Finder process is distributed, a parent server sums up the scores returned from its children servers for the same person. The returned experts then may be merged and re-ranked to pass back up to the parent or agent.

Software Agents and Applications

This and the following sections discuss the agents and applications based on the described functions and services. The proposed architecture, functions, and services were used and applied to several enterprise communication and collaboration systems. Substantially all of the applications use the same REST services, but they differ in how the agents behave. Applications included a Browser Agent, a Call Center Agent, and a Google Wave Agent.

Browser Agent

Figure 7:
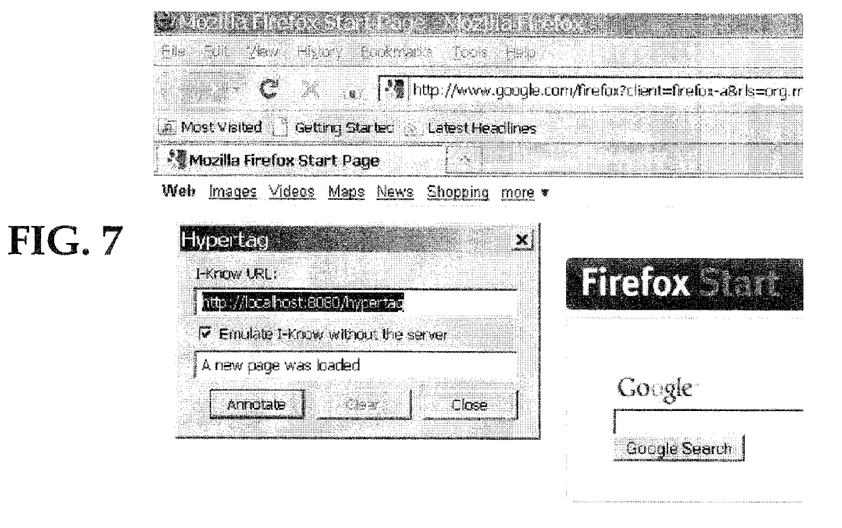
FIG. 7 illustrates a software agent embedded in Firefox browser in accordance with an embodiment of the present invention.

The browser agent in our study is a Firefox extension that monitors and annotates the web page a user is viewing. A user can activate and deactivate the agent from the browser menus and ask the agent to annotate the current page or restore the original page. The user can also configure the agent to use a different REST service by entering a different URI. FIG. 7 is a screenshot of the interface to our browser agent in front of the Firefox browser window.

Call Center Agent

The software agent in our study assists human agents in call centers by finding relevant information in incoming contacts (e.g. emails) to save human agents from searching for them. Each incoming email was intercepted by the software agent to find and identify the important concepts and recommend experts related to the email using our REST services. The email was then enriched to embed found information as hyperlinks into the original email, and forwarded to the system. When a human agent receives this enriched email, he can click the links to obtain the detailed information.

Figure 8:
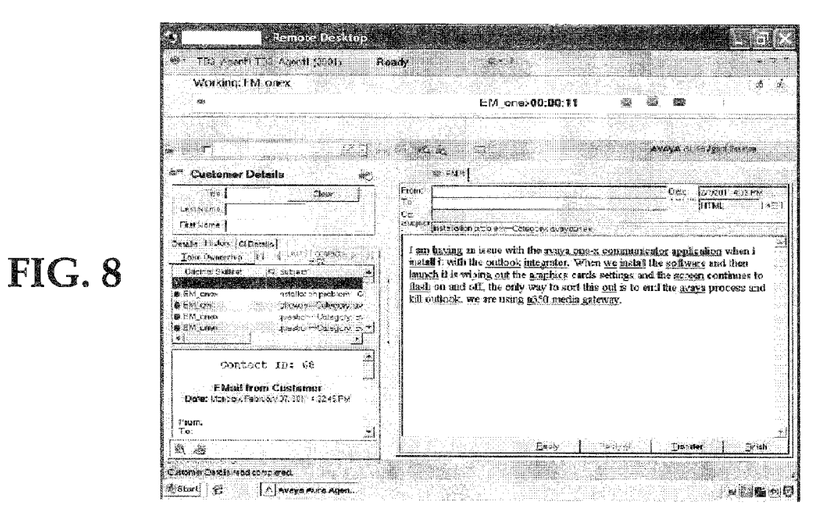
FIG. 8 illustrates an annotated email in a call center client.

FIG. 8 is a screenshot of an annotated email in a prototype Call Center system, as seen by a human agent, in accordance with an embodiment of the present invention.

Google Wave Agent

We developed a special software agent, referred here as an iknow wave robot, for Google Wave using Google Robot API to monitor and annotate multi-party group chat in real-time. To enable this agent function, a user just needs to invite the iknow wave robot to the current Wave conversation. When a user clicks a button to finish his chat, the agent will invoke the REST services and annotate the chat text with hyperlinks that point to the relevant concepts and information to bridge the semantic gap in collaboration. These hyperlink annotations may be propagated to all participants of the Wave session in near real-time. Any user can click a link in the chat window to visit it.

Implementation and Experiments

This and following sections describe implementations and experimental results in accordance with embodiments of the present invention. We implemented a prototype REST server system using SWI-Prolog (SWI-Prolog). The HTTP servers were Prolog images (executable program) compiled for different machines. Our current RDF database contains triples from three sources as listed in Table 2 below.

TABLE 2

Size of knowledge sources:

| Source | Triples |
|---|---|
| Wikipedia (2006/03/26) | 47,054,407 |
| database | 3,182,721 |
| product | 75 |
| total | 50,237,203 |

To simulate distributed REST services that contain different knowledge bases, the Wikipedia RDF file was broken up at random into 10 small sets each with up to 5 million triples. This resulted in 12 text files in N-Triples format. These 12 files may be loaded into SWI-Prolog, indexed and converted into binary SWI-Prolog RDF database format for efficient loading. The following table (Table 3) compares the size (KB) of text files with the size (KB) of binary databases. This table shows that for most large files, the binary format has an over 80% size reduction.

| Name | text | binary | ratio |
|---|---|---|---|
| WP_0 | 753243 | 148159 | 19.67% |
| WP_1 | 753268 | 149143 | 19.80% |
| WP_2 | 753986 | 147896 | 19.62% |
| WP_3 | 753976 | 147493 | 19.56% |
| WP_4 | 754396 | 149513 | 19.82% |
| WP_5 | 753430 | 148539 | 19.72% |
| WP_6 | 753364 | 148594 | 19.72% |
| WP_7 | 753890 | 149200 | 19.79% |
| WP_8 | 753979 | 149268 | 19.80% |
| WP_9 | 309799 | 67885 | 21.91% |
| database | 380004 | 73624 | 19.37% |
| product | 10 | 7 | 70.00% |

These binary databases were loaded into the memory of different machines according to their capacity. This distributed configuration allows us to recruit different number of non-dedicated machines, ranging from powerful servers to even notebook computers. The smallest system that provides satisfactory performance for the entire 50+ million triples consisted of two Linux machines (3.0 GHz CPU/4 GB RAM and 1.6 GHz CPU/4 GB RAM), each with about 25+ million triples.

To test the performance of the distributed servers, we selected 3 Wikipedia binary databases WP_{0,1,2}, and distributed them into three server trees in a LAN environment. The first server tree had one root node containing all 15 million triples; the second server tree had one root with 5 million and one child with 10 million triples; the third tree had one root and two children, each with 5 million triples. In all these trees, the root server was a Windows 2003 Server machine with Dual Core (3.0 GHz and 2.99 GHz) and 2 GM RAM and the child servers consisted of two Linux machines mentioned above. To test the performance of these trees, a test text of 1142 characters was sent 10 times to the root server which returns 30 annotations. The average service execution time was recorded using Prolog time/1 predicate on the root server and summarized in the following table (Table 4) with standard deviations. The execution time includes time for local function, service composition as well as logging.

TABLE 4

Performance of three server trees:

| Server tree | Avg. Time (second) |
|---|---|
| 1 node | 0.406 |
| 2 nodes | 0.390 |
| 3 nodes | 0.401 |

Our results showed that a distributed function may outperform its local version when it is distributed over faster machines. When the two Linux machines with more RAM were used, the average service execution time on the root was improved slightly (2 and 3 vs. 1). Also the test showed that parallel distribution of a function to two nodes created only a small overhead compared to distribution to one node (3 vs. 2).

A Fast Process to Calculate Time Weight in RDF Graphs, Usable in Semantic Web-Based Proactive Search for an Enterprise Resource Description Framework ("RDF") is a cornerstone of Semantic Web. The basic unit of RDF is a triplet of (subject, predicate, object) that asserts a relation between the subject resource and the object resource. A RDF graph is a set of such triplets where subject and object may be represented as nodes and predicates are edges. When a RDF graph represents an event in the real world, it is often associated with a time point or interval of that event. For example, a RDF graph may represent that John sent an email to Mary on Mar. 30, 2011. Another RDF graph may represent that some people participated in a conference from 9:00 am to 11:00 am on Mar. 30, 2011.

RDF can be used in many applications, one of which is an implicit social network. In implicit social networks, the relations between entities may not be managed explicitly by people but change based on when the relation is evaluated and what interactions may be used to derive the relations. These interactions can be represented as RDF graphs and used to derive social network RDF graphs through an inference engine. For example, given a set of RDF graphs representing the email exchanges between employees in a company, an inference engine can derive the implicit social network RDF graph based on the email exchanges.

Because employees interact with different people at different time, it is important to evaluate the strength of social relation based on the history of the interactions. More recent and more frequent interactions create stronger relations than less recent and less frequent interactions. For instance, if John sent 100 emails to Mary and 50 emails to Bob in last month, then John's relation with Mary is stronger than with Bob based on these interactions. On the other hand, if John sent 1000 emails to Mary last year, and 1000 emails to Bob this year, then John's relation with Bob is stronger than with Mary based on these emails.

Due to the highly dynamic nature of implicit social networks, frequent reevaluation of relation strength is necessary. Whenever a new social interaction, e.g., a new email, is added, the inference engine needs to reevaluate the affected relations. The inference engine also needs to reevaluate a relation depending on a reference time. For example, if John's relation with Mary depends on 1000 emails between them in 2010, the strength of this relation will decrease as time goes by if no new interactions are observed.

The time complexity of such reevaluation is important to the usability of these networks. Assuming an implicit social network of E entities, where the average number of interactions between two entities is A, then the time complexity to reevaluate N changes on entire set of A is $O(N*E*E*A)$. This time complexity translates to $O(10^9*N)$ calculations when E=1000 (large corporation) and A=1000 (average 5 emails per day for 5 years). Reevaluation from scratch every time is therefore not efficient.

What is needed is a method and system that efficiently evaluate the time weight in RDF graphs. When used in social networks, the method should achieve optimal time complexity, e.g., $O(N*E*E)$ for a network of E entities. Embodiments in accordance with the present invention provide such a method and system based on RDF and an exponential decay function that supports efficient incremental updates of time weight in RDF graphs.

Researchers in the field have attempted to introduce temporal information into the RDF framework. The goal of these solutions has been to associate a time domain with a RDF triple to assert the validity of that triple. However, the validity of a triple at a particular time interval or point in time is not the time weight between two people. For instance, the fact that John sent Mary an email on Mar. 30, 2011 does not tell the time weight of their relation, which depends on all social interactions, including emails, between them.

Some RDF models may introduce weight to edges in a RDF graph, but an efficient method of calculating that weight has not been developed in the art. In contrast, embodiments in accordance with the present invention calculate the weight in optimal or near-optimal time.

Figure 9:
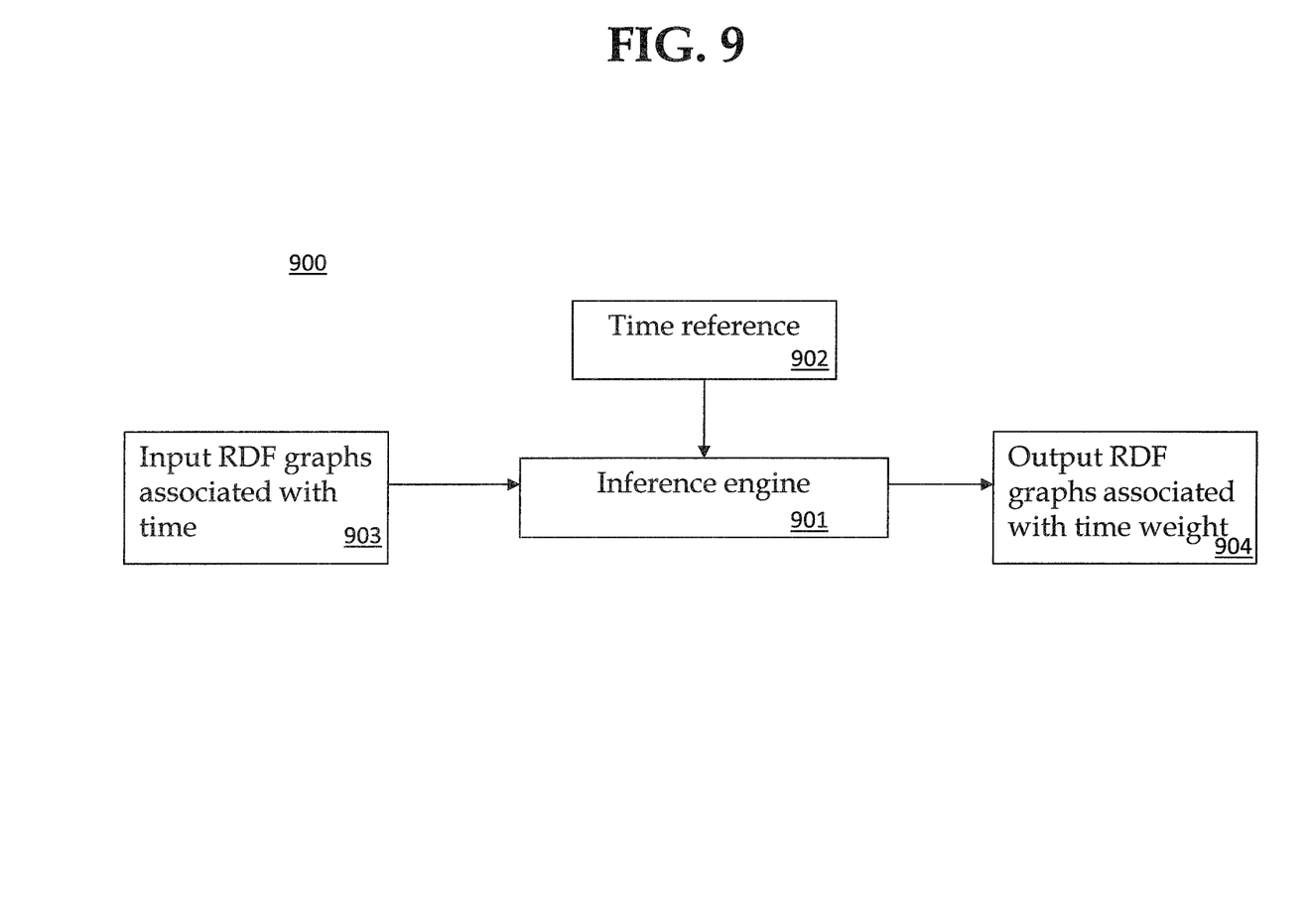
FIG. 9 illustrates an architecture of the time weight calculation system in accordance with an embodiment of the present invention.

FIG. 9 illustrates a system 900 in accordance with an embodiment of the present invention. An input module 903 provides a set of RDF graphs associated with time values, either points or interval, at which or during which a new social interaction occurred. Input module 903 provides these RDF graphs to an inference engine module 901. A time reference module 902 provides time values to the inference engine module 901. The inference engine module 901 first converts the time values into timestamps, a timestamp being a nonnegative integer representing the elapsed time from an epoch time to the time value. Then the inference engine module 901 calculates a time weight from the timestamps with respect to the given time reference as described below. The epoch time may be known as a beginning of time in a time system, for instance 00:00:00 UTC on 1 Jan. 1970 in some computers.

Assume that a relation R is derived from a set of n activities each with timestamp $T_i$, then the time weight of this relation, with respect to a reference timestamp T, is provided by calculating less time weight as the time difference increases between timestamp $T_i$ and timestamp T, i.e., an inverse relationship. For instance, the inverse relationship may be inversely proportional to the time difference, or may be inversely proportional to a function of the time difference (e.g., a logarithmic function), or may be an exponential decay function. In one embodiment in accordance with the present invention, the inverse relationship may be provided according to Equation 5, where C is a normalizing factor and λ is a scaling factor. The factors C and λ may be chosen to keep the weight in the desired range, which is determined by the system.

$$tw(T, \lambda, C, R) = C \sum_{i=1}^{n} e^{-\lambda(T-T_i)} = Ce^{-\lambda T} \sum_{i=1}^{n} e^{\lambda T_i}, \quad (5)$$

$$R = \{T_i \mid T_i \leq T, 1 \leq i \leq n\}$$

The calculated time weight is stored for incremental calculations. There may be various mechanisms to represent time weight RDF. Two embodiments of methods to represent time weight RDF are illustrated below.

In a first embodiment in accordance with the present invention, using N-Quad, the time weight may be stored in a file and the file may be linked to a RDF graph by a context URI (the fourth component in an N-Quad-extended RDF triple). The context URI identifies a context file so that it can be accessed, for instance by using HTTP.

The following statement may be added or changed in the context file:

<ex:interact> <ex:time_weight> "{time weight}".
In the RDF file:
<ex:john> <ex:interact> <ex:mary> <{URI to the context file}>.

In a second embodiment in accordance with the present invention, a RDF reification statement can be used to add the time value as a property to a RDF graph as illustrated below.

```
<ex:john> <ex:interact> <ex:mary> .
_:xxx rdf:type rdf:Statement .
_:xxx rdf:subject <ex:john> .
_:xxx rdf:predicate <ex:interact> .
_:xxx rdf:object <ex:mary> .
_:xxx ex:time_weight "{time value}".
```

Updating the saved weight of a relation proceeds as follows. A saved time weight of a relation should be updated whenever a new input RDF graph has been added to, or deleted from, a relation. If a new RDF graph is at timestamp Tn+1 is added to relation R, then the new time weight of R, with respect to the same reference timestamp, can be calculate based on previous time value by calculating less time weight as the time difference increases between timestamp Tn+1 and timestamp T, i.e., an inverse relationship. For instance, the inverse relationship may be inversely proportional to the time difference, or may be inversely proportional to a function of the time difference (e.g., a logarithmic function), or may be an exponential decay function. In one embodiment in accordance with the present invention, the inverse relationship may be provided according to Equation 6, where is a normalizing factor and A is a scaling factor.

$$tw(T,\lambda,C,R \pm \{T_{n+1}\}) = tw(T,\lambda,C,R) \pm Ce^{-\lambda(T-T_{n+1})}, T_{n+1} \leq T \quad (6)$$

A saved time weight of a relation should be updated whenever a new reference timestamp is provided. The reference timestamp, or reference time, is a time moment after the epoch time. Reference time is a time chosen by an application running on the computer system whereas epoch time is a fixed time for all applications running on the system. Assume that tw(Tx, . . . ) is the previous time weight for R at time reference Tx and tv(Ty, . . . ) is the new time weight for R at a different reference timestamp Ty, then the new time weight is calculated incrementally by calculating less time weight as the time difference increases between timestamp Tx and timestamp Ty, i.e., an inverse relationship. For instance, the inverse relationship may be inversely proportional to the time difference, or may be inversely proportional to a function of the time difference (e.g., a logarithmic function), or may be an exponential decay function. In one embodiment in accordance with the present invention, the inverse relationship may be provided according to Equation 7, where C is a normalizing factor and λ is a scaling factor.

$$tw(T_y,\lambda C,R) = tw(T_x,\lambda C,R)e^{\lambda T_x - \lambda T_y} \quad (7)$$

Embodiments in accordance with the present invention provide an optimal or near-optimal calculation of the time weight because a new time-weight values can be calculated from previous values based on equations (6) and (7) in a minimal number of steps. When adding or removing a new time point, one step is calculated for the newly added or removed time point. Following equation (6), the one step is calculated by adding or subtracting an exponential term, therefore the calculation is performed in an optimal number of steps, and without undue computational complexity. Likewise, when the reference time is shifted, we have to calculate at least one step for the new reference time. Again, equation (7) does exactly one calculation which multiplies the exponential term. Therefore it is also performed in an optimal number of steps, and without undue computational complexity.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the present invention to the precise form disclosed. Modifications and variations may be possible in light of the above teachings or may be acquired from practice of the present invention.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶ 6, and any claim without the word "means" is not so intended.

What is claimed is:

1. A method to calculate time weight in an RDF graph, comprising:
providing one or more triples of the RDF graph to an inference engine module, the one or more triples comprising a time information;
providing an epoch time to the inference engine; calculating an elapsed time from the epoch time to the time value; and
inversely weighting the time information by the elapsed time to provide a calculated time weight.

2. The method of claim 1, wherein inversely weighting the time information comprises inversely weighting the time information by an inversely proportional function of the elapsed time.

3. The method of claim 1, wherein inversely weighting the time information comprises inversely weighting the time information by an inversely proportional logarithmic function of the elapsed time.

4. The method of claim 1, wherein inversely weighting the time information comprises inversely weighting the time information by an exponential decay function of the elapsed time.

5. The method of claim 1, wherein inversely weighting the time information comprises inversely weighting the time information by a function in accordance with the following relationship:

$$tw(T, \lambda, C, R) = C\sum_{i=1}^{n} e^{-\lambda(T-T_i)} = Ce^{-\lambda T}\sum_{i=1}^{n} e^{\lambda T_i},$$

$$R = \{T_i \mid T_i \leq T, 1 \leq i \leq n\},$$

wherein:
  i comprises an index variable;
  n comprises a number of RDF graph triples provided to the inference engine module;
  $T_i$ comprises a time of the i-th triple of the RDF graph with respect to the epoch time;
  T comprises a reference time with respect to the epoch time;
  R comprises a set of times $T_i$ that are less than T;
  $\lambda$ comprises a scaling factor;
  C comprises a normalization factor; and
  tw comprises the calculated time weight.

6. The method of claim 1, wherein at least one triple of the one or more triples of the RDF graph comprises an N-Quad-extended RDF triple.

7. The method of claim 6, wherein the time information of the one or more triples of the RDF graph comprises a fourth component of the N-Quad-extended RDF triple.

8. The method of claim 1, wherein the time information of the one or more triples of the RDF graph comprises a time property of the RDF graph.

9. The method of claim 1, wherein the time information of the one or more triples of the RDF graph comprises a RDF reification statement of the RDF graph.

10. A method to update a time weight of a relation when an RDF graph has been added to or deleted from the relation, comprising:
  providing to an inference engine module the time weight of the relation;
  providing identification to an inference engine module of the RDF graph comprising timestamp Tn+1;
  providing an epoch time value to the inference engine;
  calculating an elapsed time from the epoch time to timestamp Tn+1; and
  updating the saved time weight by an inversely weighted function of the elapsed time.

11. The method of claim 10, wherein the inversely weighted function comprises a function in accordance with the following relationship:

$$tw(T,\lambda,C,R\pm\{T_{n+1}\})=tw(T,\lambda,C,R)\pm Ce^{-\lambda(T-T_{n+1})}, T_{n+1}\leq T,$$

wherein:
  n comprises a number of RDF graph triples provided to the inference engine module;
  Tn−1 comprises a time of the (n−1)-th triple of the RDF graph with respect to the epoch time;
  T comprises a reference time with respect to the epoch time;
  R comprises a set of times for triples of the RDF graph;
  $\lambda$ comprises a scaling factor;
  C comprises a normalization factor; and
  tw comprises the calculated time weight.

12. A method to update a time weight of a relation represented by an RDF graph, when a new reference timestamp is provided, comprising:
  providing to an inference engine module the time weight of the relation at a first reference timestamp;
  providing a second reference timestamp to the inference engine;
  calculating an elapsed time from the first reference timestamp to the second reference timestamp; and
  updating the time weight of the relation by an inversely weighted function of the elapsed time.

13. The method of claim 10, wherein the inversely weighted function comprises a function in accordance with the following relationship:

$$tw(T_y,\lambda,C,R)=tw(T_x,\lambda,C,R)e^{\lambda T_x-\lambda T_y},$$

wherein:
  Tx comprises a first reference timestamp;
  Ty comprises a second reference timestamp;
  R comprises a set of times for triples of the RDF graph;
  $\lambda$ comprises a scaling factor;
  C comprises a normalization factor; and
  tw comprises the calculated time weight.

14. A system to calculate time weight in an RDF graph, comprising:
  an inference engine module;
  a first communication interface to the inference engine module, the first communication interface configured to provide one or more triples of the RDF graph to the inference engine module, the one or more triples comprising a time information;
  a first communication interface to the inference engine module, the first communication interface configured to provide an epoch time to the inference engine,
  wherein the inference engine module is configured:
    to calculate an elapsed time from the epoch time to the time value; and
    to inversely weight the time information by the elapsed time, to provide a calculated time weight.

15. The system of claim 14, wherein the inference engine is further configured to inversely weight the time information by an exponential decay function of the elapsed time.

16. The system of claim 14, wherein the inference engine is further configured to inversely weight the time information by a function in accordance with the following relationship:

$$tw(T, \lambda, C, R) = C\sum_{i=1}^{n} e^{-\lambda(T-T_i)} = Ce^{-\lambda T}\sum_{i=1}^{n} e^{\lambda T_i},$$

$$R = \{T_i \mid T_i \leq T, 1 \leq i \leq n\},$$

wherein:
  i comprises an index variable;
  n comprises a number of RDF graph triples provided to the inference engine module;
  $T_i$ comprises a time of the i-th triple of the RDF graph with respect to the epoch time;
  T comprises a reference time with respect to the epoch time;
  R comprises a set of times $T_i$ that are less than T;
  $\lambda$ comprises a scaling factor;
  C comprises a normalization factor; and
  tw comprises the calculated time weight.

17. The system of claim 14, wherein at least one triple of the one or more triples of the RDF graph comprises an N-Quad-extended RDF triple.

18. The system of claim 14, wherein the time information of the one or more triples of the RDF graph comprises a time property of the RDF graph.

19. The system of claim 18, wherein the time information of the one or more triples of the RDF graph comprises a fourth component of the N-Quad-extended RDF triple.

20. The system of claim 14, wherein the time information of the one or more triples of the RDF graph comprises a RDF reification statement of the RDF graph.

* * * * *